July 21, 1959
H. E. COY
2,895,226
MEASURING INSTRUMENT
Filed Nov. 1, 1957
2 Sheets-Sheet 1
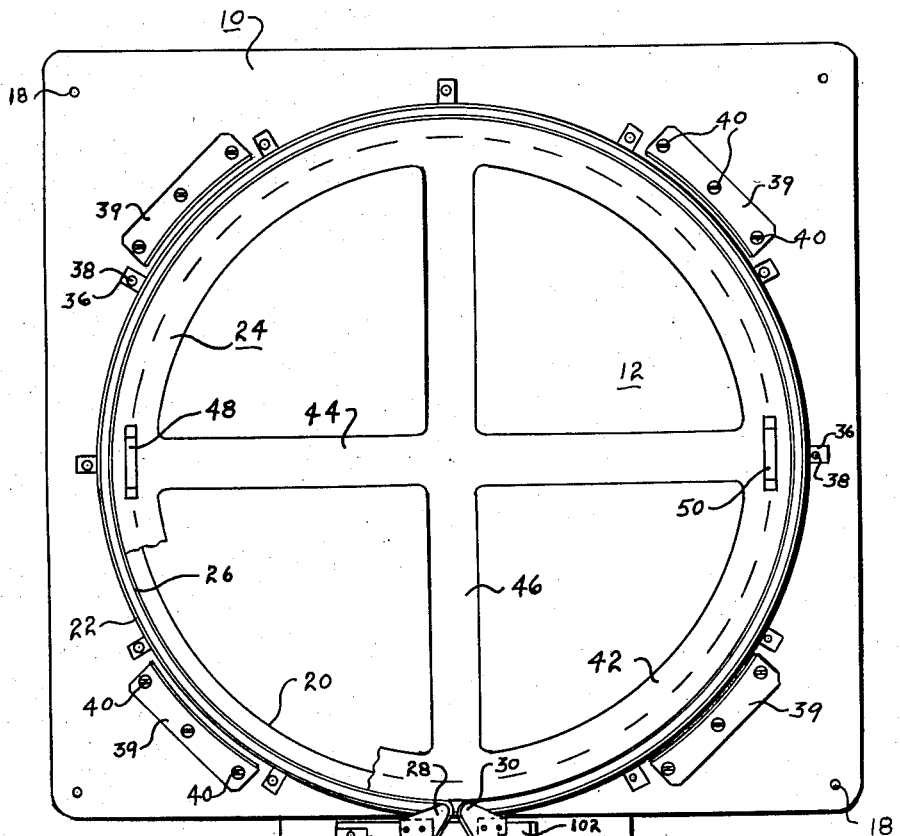
FIG. 1
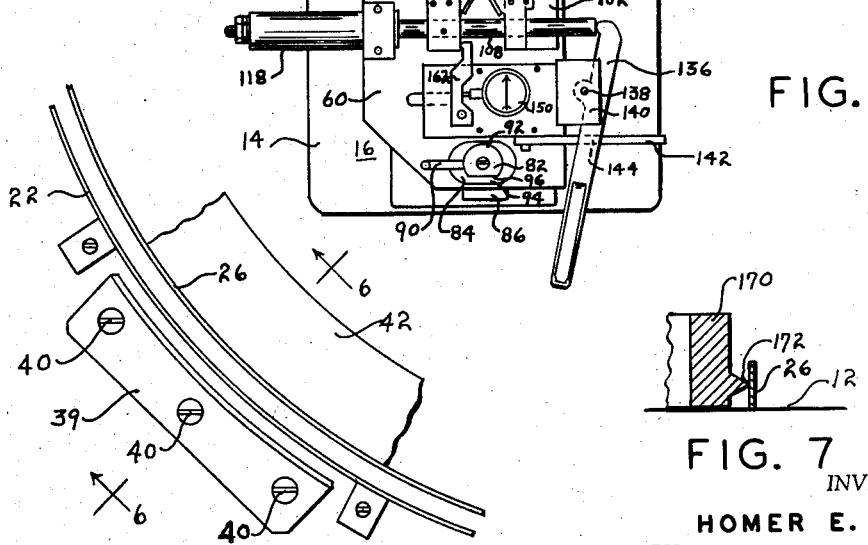
FIG. 5
FIG. 7
INVENTOR.
HOMER E. COY
BY M. A. Hobbs
ATTORNEY July 21, 1959 — H. E. COY — 2,895,226
MEASURING INSTRUMENT
Filed Nov. 1, 1957 — 2 Sheets-Sheet 2

INVENTOR.
HOMER E. COY
BY M. A. Hobba
ATTORNEY

United States Patent Office 2,895,226
Patented July 21, 1959

2,895,226

MEASURING INSTRUMENT

Homer E. Coy, South Bend, Ind., assignor to Ace Tool Engineering Co., Inc., South Bend, Ind., a corporation of Indiana Application November 1, 1957, Serial No. 693,838

8 Claims. (Cl. 33—179)

The present invention relates to a measuring instrument and more particularly to an instrument for measuring the outside circumference of circular objects and articles.

One of the principal objects of the present invention is to provide an instrument for accurately measuring the circumference of relatively narrow annular outside surfaces of objects and articles.

Another object of the invention is to provide a periphery gauge which can be readily checked and adjusted for accuracy including compensating adjustments for variations in temperature of the objects being measured and the parts and elements of the gauge.

Still another object is to provide a periphery gauge which can be easily set and manipulated for measuring objects and which is so constructed as to minimize inaccuracies resulting from the human factor.

Another object of the invention is to provide a periphery gauge having a band for encircling the annular surface to be measured, which applies the band tightening force to each end thereof equally on both sides of the center line of the band.

Additional objects and advantages of my invention will become apparent from the following description and accompanying drawings, wherein:

Figure 1 is a top plan view of my periphery gauge showing the master ring or gauge check device mounted therein for adjusting the gauge before it is used;

Figure 5 is an enlarged fragmentary view of the gauge showing the position of the parts adjacent the article being tested when a measurement is being taken;

Figure 7 is a vertical cross sectional view of an object having a peripheral surface of the type for which the present gauge is primarily designed.

Figure 2:
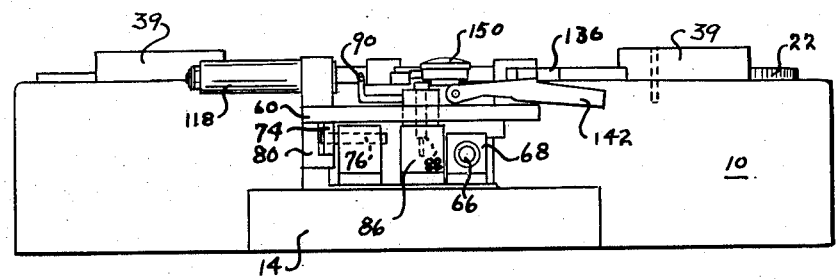
Figure 2 is a front elevational view of the periphery gauge shown in Figure 1.
Figure 3:
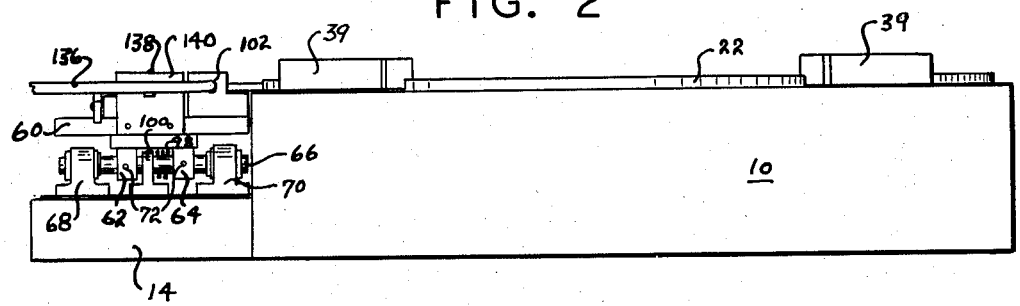
Figure 3 is a side elevational view of the gauge shown in Figures 1 and 2.

Referring more specifically to the drawings, numeral 10 designates a base preferably of heavy sections of cast iron having an upper surface 12 on which articles to be measured are mounted and an extension 14 on the front forming a lower level upper surface 16 on which the mechanism for operating the gauge is mounted. Holes 18 are provided in each corner of the base for eye bolts or studs used in lifting and moving the gauge. Each gauge is set or constructed for measuring peripheral surfaces falling within a relatively limited range, the range of the gauge shown in Figure 1 covering peripheral surfaces coming within the area of the annular portion defined by line 20 and a retainer ring 22; however, the gauge can be modified with little difficulty to change the range to any size desired. A master ring 24 for checking and adjusting the gauge before measurements on the actual object are made is shown inserted in the gauge in the place occupied by the object when a measurement is being made.

Figure 6:
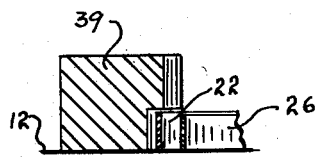
Figure 6 is a cross sectional view of the structure shown in Figure 5 taken on line 6—6.

A measuring band 26 of thin highly flexible steel is mounted on the upper surface 12 within retainer ring 22 and is anchored at each end on anvils 28 and 30 and is secured thereto by bolts 32 and 34, respectively. The band is adapted to expand in diameter when anvils 28 and 30 are moved apart from one another until it engages the internal surface of retainer ring 22 and to contract in diameter when the anvils are moved toward one another until the band is drawn tightly around the peripheral surface being measured. Retainer ring 22 is annular in shape, extending completely around the area in which the object is placed, with the exception of a small section extending to either side of the two anvils, and the ring is secured to base 10 by a plurality of lugs 36 and screws 38 extending through the lugs into the base. To assist in locating the object within ring 22 and measuring band 26, four locating blocks 39 are mounted on the upper surface 12 adjacent the outside edge of ring 22 and secured to the upper surface of base 12 by a plurality of screws or bolts 40. These locating blocks are higher than the ring and band and preferably extend inwardly over the upper edge of the ring and also the band when the latter is in its expanded position against the inner surface of the ring, as shown in Figure 6. The locating blocks may be placed either on the outside or inside of measuring band 26, depending on the shape of the object being measured.

Master ring 24 is of one piece steel construction consisting of an annular member 42 reinforced by cross members 44 and 46 joined integrally with the inner edge of member 42. In order to facilitate inserting the master ring in place in the gauge and removing it therefrom, handles 48 and 50 are provided on opposite sides of member 42. The peripheral surface of member 42 is precision machined to the exact diameter desired for the peripheral surface of the object being measured.

Anvils 28 and 30 are mounted on a movable platform 60 which is supported on the right hand side of extension 14, as viewed in Figure 1, by bosses 62 and 64, shaft 66 and linear motion bearings 68 and 70, the two bosses through which the shaft passes being rigidly secured to the shaft by set screws 72 so that the shaft will move with platform 60 toward and away from the main part of the base 10. The platform is supported on the left hand side by a roller 74 journalled on a pin 76 which in turn is rigidly mounted on extension 14 by a boss 78. The platform glides freely on roller 74 and is retained in place thereon by a bracket 80 secured to the underside of the platform and forming a track for the lower side of the roller. The present construction is not limited to any particular type of bearing or movable mounting means so long as the anvils carried by the platform are permitted to move freely to and from the peripheral surface being measured.

The platform, carrying anvils 28 and 30, is withdrawn from the measuring position by a cam 82 disposed in a slot 84 in the platform and rotatably mounted on boss 86 by a bolt 88, said boss being rigidly secured to the upper surface of extension 14. The cam 82 is rotated by a lever or handle 90 in order either to place the high side 92 in contact with surface 94 of slot 84 to thereby withdraw and return the platform from the measuring position or to place the low side 96 on the side facing surface 94 so that the platform can travel freely to and from the measuring position. The cam primarily serves as a retainer for holding the platform and the anvils in their withdrawn positions and measuring band 26 in its expanded position in contact with retainer ring 22. The platform is constantly urged toward the measuring position by a coil spring 98 mounted on shaft 66 and reacting between one side of boss 64 and one side of lug 100 secured to the upper surface of extension 14 and having a hole therein through which shaft 66 passes. The spring is free to move the platform and anvils to the measuring position when cam 82 is rotated to the position shown in Figure 1.

Figure 4:
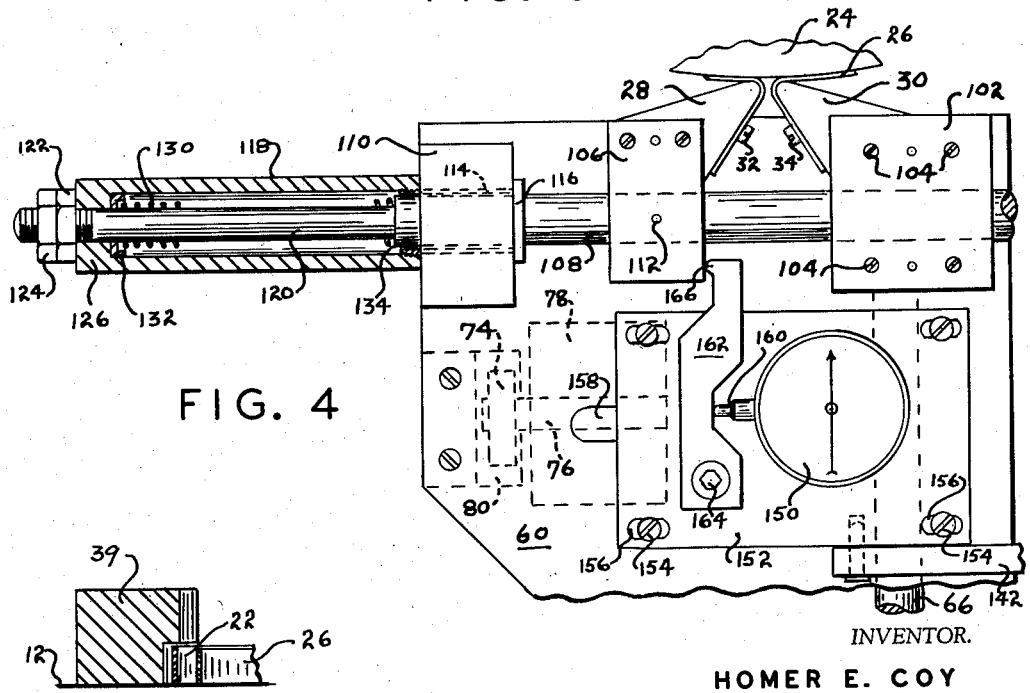
Figure 4 is an enlarged fragmentary view of the gauge showing the mechanism for operating the gauge in detail.

Anvil 30 is rigidly mounted on platform 60 by a block 102 secured to the platform by a plurality of screws 104 and anvil 28 is movably mounted on a support 106 carried by a shaft 108 journaled in block 102 and a second block 110 for axial movement therein, support 106 being rigidly secured to shaft 108 by a set screw 112. Movement of shaft 108 to the right as seen in Figure 4 moves anvil 28 to its measuring position and movement of the shaft to the left moves the anvil to the gauge loading position. A sleeve 114 having a flange 116 surrounds shaft 108 in block 110 and extends beyond the left hand side of said block to form a support for a cylinder 118 which is threaded onto the end of the sleeve butting the adjacent end of the cylinder against block 110 and pulling flange 116 into firm engagement with the right hand side of block 110. A reduced diameter portion 120 of shaft 108 extends through cylinder 118 and projects beyond the end for receiving adjustment nuts 122 and 124 which limit the travel of shaft 108 in the right hand direction, the partially closed end 126 forming a stop for said nuts. The shaft is urged in the right hand direction by a coil spring 130 reacting between a spring retainer 132 seated on the partially closed end of the cylinder and the shoulder 134 formed between the two different diameter portions of shaft 108. The spring is employed to tighten the measuring band 26 around the peripheral surface in preference to a manual means in that it provides a controlled repeating force for tightening the band, thereby eliminating possible error from variations in the gauge reading. The spring also eliminates possible damage to the band which might result from over-tightening and the consequent stretching of the band.

The shaft is moved manually in the left hand direction, i.e. to the gauge loading position, by a lever 136 pivoted on a pin 138 in a bracket 140, engaging the right hand end of shaft 108. Bracket 140 is secured to the edge of platform 60 and moves with the platform. In order to free the operator for loading the gauge after lever 136 has moved shaft 108 and anvil 28 to the gauge loading position, a lever 142 pivotally mounted on platform 60 and having a notch 144 for engaging lever 136 locks the free end of the lever to the right and prevents spring 130 from returning shaft 108 and anvil 28 to their measuring positions. Lever 136 is readily released from its locked position by moving the free end of lever 142 downwardly until lever 136 is free of notch 144.

An indicator 150 for reading the measurements of the object in the gauge is mounted firmly on a mounting block 152 which is adjustably secured to platform 60 by bolts 154 extending through slots 156 into threaded holes in the platform. A key (not shown) and a key slot 158 are provided between mounting block 152 and the platform to assist in making accurate adjustments when the block is moved to the left or right to adjust the position of the indicator relative to movable support 106. The indicator is a standard plus and minus dial indicator of a well known type and is operatively connected to movable support 106 by its stem 160 and an arm 162 pivoted at one end on a pin 164 in mounting block 152 and having a finger 166 on the other end for engaging the right hand side of support 106.

An object 170 having a narrow peripheral surface 172, such as that shown in Figure 7, can be effectively measured by the present gauge when the object is inserted in the gauge in place of master ring 24. By the use of the anvils which move directly toward each other when the peripheral surface of an object is measured, with only a small space between their apices, the measuring band attached thereto is pulled and tightened around the object on the direct center line, thus avoiding distortions of the band and possible displacement of the band from the peripheral surface, resulting from sidewise force occurring in the operation of conventional peripheral gauges. While the present gauge is designed primarily for measuring a narrow peripheral surface, it can also effectively measure a broad peripheral surface.

In using the present gauge, the operator first moves the free end of lever 136 to the right and thereby moves shaft 108 and anvil 28 to the left in opposition to the force of the spring until lever 136 is engaged by notch 144, and cam 82 is rotated to place the high point 92 in contact with surface 94 of slot 84 to thereby withdraw the platform and hold the anvils away from their measuring position. When the cam and lever 136 are moved to this position, measuring band 26 is moved outwardly to its expanded position in contact with the inner surface of retaining ring 22. Before the actual measurement operation is made, master ring 24 may be inserted in the gauge, as shown in Figure 1, cam 82 is rotated to the position shown in Figure 1 so that the platform and anvils are free to move toward the surface being measured under the force of spring 98, and lever 136 is then released by unlocking lever 142. When lever 136 is released, spring 130 moves shaft 108, support 106 and anvil 28 to the right, pulling measuring band 26 firmly around the peripheral surface of the master ring. As support 106 moves to the right it moves arm 162 and stem 160 of the indicator, thereby registering the measurement of the peripheral surface of the ring on the indicator. The indicator is then adjusted so that it registers zero on the dial. After this adjustment has been made, lever 136 is moved to its locked position moving shaft 108, anvil 28 and measuring band 26 to their gauge loading positions, and the platform and anvils are withdrawn by a half revolution of cam 82. The master ring is removed from the gauge and the object having the peripheral surface to be measured is inserted in the gauge in place of the master ring. Cam 82 is then returned to the position shown in Figure 1 and lever 136 unlocked by the operator, and anvil 28 is moved by spring 130 to the right pulling measuring band 26 firmly around the peripheral surface of the object. The dial of the indicator is now read and deviation of the dial hand from the zero position, either plus or minus, is noted. After the measurement has been read from the dial, the anvil 28 is moved by lever 136 to the left and the platform is withdrawn by cam 82, as previously described, and the gauge is now ready for a repeat measuring operation.

While only one embodiment of my gauge has been described herein, various changes and modifications may be made in the structure without departing from the scope of the invention.

I claim:

1. An apparatus for measuring narrow peripheral surfaces of objects, comprising a base having a substantially flat upper surface with a circular portion for receiving objects to be measured, a platform movable toward and away from said circular portion, bearings mounted on said base for movably supporting said platform, means defining a slot in said platform, a cam mounted on said base and extending into said slot for withdrawing said platform from said circular portion, a spring for urging said platform toward said circular portion, a shaft mounted on said platform and movable axially in a direction tangential to said circular portion, spaced blocks on said platform containing bearings for slidably supporting said shaft, a stationary anvil mounted on said platform and extending to said circular portion, a movable anvil rigidly mounted on said shaft and extending to said circular portion, an arm pivotally mounted on said platform and operatively connected to said movable shaft, an indicator mounted on said platform and operatively connected to said arm, a spring around one end of said shaft for urging said movable anvil toward said other anvil, an adjustable stop means for limiting the movement of said movable anvil, a lever operatively connected to said shaft for moving said movable anvil away from said other anvil, a lever for locking said movable anvil in its withdrawn position, a measuring band of flexible metal on said circular portion connected at its ends to said anvils to form a loop with an opening between said anvils, a retaining ring for said band, blocks for locating the object to be measured on said circular portion, and a master ring for setting said indicator prior to measuring an object.

2. An apparatus for measuring narrow peripheral surfaces of objects, comprising a base having a substantially flat upper surface with an annular portion for receiving objects to be measured, a platform movable toward and away from said annular portion, bearings mounted on said base for movably supporting said platform, means defining a slot in said platform, a cam mounted on said base and extending into said slot for withdrawing said platform from said annular portion, a yieldable means for urging said platform toward said annular portion, a shaft mounted on said platform and movable axially in a direction tangential to said annular portion, an anvil mounted on said platform and extending to said annular portion, a movable anvil secured to said shaft and extending to said annular portion, an arm pivotally mounted on said platform and operatively connected to said movable shaft, an indicator mounted on said platform and operatively connected to said arm, a yieldable means for urging said movable anvil toward said other anvil, an adjustable stop means for limiting the movement of said movable anvil, a lever operatively connected to said shaft for moving said movable anvil away from said other anvil, a means for locking said movable anvil in its withdrawn position, a measuring band of flexible material on said annular portion connected at its ends to said anvils, a retaining ring for said band, and means for locating the object to be measured on said annular portion.

3. An apparatus for measuring peripheral surfaces of objects, comprising a base having a substantially flat upper surface with an annular portion for receiving objects to be measured, a platform movable toward and away from said annular portion, a means for withdrawing said platform from said annular portion, a yieldable means for urging said platform toward said annular portion, a shaft mounted on said platform and movable axially in a direction tangential to said annular portion, an anvil mounted on said platform and extending to said annular portion, an anvil secured to said shaft and extending to said annular portion, an arm pivotally mounted on said platform and operatively connected to said movable shaft, an indicator mounted on said platform and operatively connected to said arm, a yieldable means for urging said second mentioned anvil toward said other anvil, a lever operatively connected to said shaft for moving said second mentioned anvil away from said other anvil, a means for locking said second mentioned anvil in its withdrawn position, a measuring band of flexible material on said annular portion connected to said anvils to form a loop with an opening between said anvils, and a retaining ring for said band.

4. An apparatus for measuring peripheral surfaces on objects, comprising a base having a substantially flat upper surface with an annular portion for receiving objects to be measured, a platform movable toward and away from said annular portion, a means for withdrawing said platform from said annular portion, an axially movable shaft mounted on said platform, an anvil mounted on said platform and extending to said annular portion, an anvil secured to and movable with said shaft and extending to said annular portion, an arm pivotally mounted on said platform and operatively connected to said movable shaft, an indicator mounted on said platform and operatively connected to said arm, a yieldable means for urging said movable anvil toward said other anvil, a lever operatively connected to said shaft for moving said movable anvil away from said other anvil, and a measuring band of flexible material on said annular portion connected at its ends to said anvils.

5. An apparatus for measuring peripheral surfaces on objects, comprising a base having an annular portion for receiving objects to be measured, a platform movable toward and away from said annular portion, a shaft mounted on said platform, an anvil mounted on said platform and extending to said annular portion, a movable anvil secured to said shaft and extending to said annular portion, an indicator mounted on said platform and operatively connected to said shaft, a yieldable means for urging said movable anvil toward said other anvil, a lever operatively connected to said shaft for moving said movable anvil away from said other anvil, and a measuring band of flexible material on said annular portion connected at its ends to said anvils.

6. In an apparatus for measuring peripheral surfaces on objects: a base having an annular portion for receiving objects to be measured, a platform movable toward and away from said annular portion, an axially movable shaft mounted on said platform, an anvil mounted on said platform and extending to said annular portion, an anvil secured to and movable with said shaft and extending to said annular portion, an indicator mounted on said platform and operatively connected to said shaft, means for moving said shaft, and a measuring band of flexible material on said annular portion connected at its ends to said anvils.

7. In an apparatus for measuring peripheral surfaces of objects: a base having an annular portion for receiving objects to be measured, a platform movable toward and away from said annular portion, an anvil mounted on said platform and extending to said annular portion, a movable anvil mounted on said platform and extending to said annular portion, an indicator mounted on said platform and operatively connected to said movable anvil, an indicator connected to said movable anvil, and a measuring band of flexible material on said annular portion connected at its ends to said anvils forming a loop with an opening between said anvils.

8. In an apparatus for measuring peripheral surfaces of objects: a base having an annular portion for receiving objects to be measured, two relatively movable anvils mounted on said base outside of said annular portion and extending to said annular portion, means supporting said anvils for movement toward and away from said annular portion, a measuring band of flexible material on said annular portion connected at its ends to said anvils forming a loop with an opening between said anvils, and an indicator connected to one of said anvils.

References Cited in the file of this patent

UNITED STATES PATENTS

| | | |
|---|---|---|
| 609,580 | Gordon | Aug. 23, 1898 |
| 783,562 | Zimmerman | Feb. 28, 1905 |
| 2,801,475 | Meyer | Aug. 6, 1957 |

FOREIGN PATENTS

| | | |
|---|---|---|
| 593,808 | Germany | Mar. 5, 1934 |